United States Patent
Senzaki

(10) Patent No.: US 9,519,322 B2
(45) Date of Patent: Dec. 13, 2016

(54) SERVER

(71) Applicant: NEC Corporation, Minato-ku, Tokyo (JP)

(72) Inventor: Hiroshi Senzaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 295 days.

(21) Appl. No.: 14/199,193

(22) Filed: Mar. 6, 2014

(65) Prior Publication Data

US 2014/0258763 A1    Sep. 11, 2014

(30) Foreign Application Priority Data

Mar. 8, 2013 (JP) ................... 2013-046388

(51) Int. Cl.
*G06F 1/30* (2006.01)
*G06F 1/28* (2006.01)
*G06F 1/26* (2006.01)

(52) U.S. Cl.
CPC .......... *G06F 1/30* (2013.01); *G06F 1/263* (2013.01); *G06F 1/28* (2013.01)

(58) Field of Classification Search
CPC .............. G06F 1/263; G06F 1/28; G06F 1/30
See application file for complete search history.

(56) References Cited

U.S. PATENT DOCUMENTS

| | | | | |
|---|---|---|---|---|
| 2006/0224907 | A1* | 10/2006 | Feldman | G06F 1/30 713/300 |
| 2007/0079151 | A1* | 4/2007 | Connor | G06F 1/263 713/300 |
| 2009/0235093 | A1* | 9/2009 | Diab | G06F 1/30 713/300 |
| 2012/0210169 | A1* | 8/2012 | Coile | G06F 11/2092 714/22 |

FOREIGN PATENT DOCUMENTS

| | | |
|---|---|---|
| JP | S63-283340 A | 11/1988 |
| JP | 2005-244830 A | 9/2005 |
| JP | 2006-203730 A | 8/2006 |
| JP | 2007-116457 A | 5/2007 |
| JP | 2007-276341 A | 10/2007 |
| JP | 2010-200279 A | 9/2010 |
| JP | 2011-60189 A | 3/2011 |

OTHER PUBLICATIONS

Japanese Office Action for JP Application No. 2013-046388 mailed on Apr. 1, 2014 with partial English Translation.

* cited by examiner

*Primary Examiner* — Dennis M Butler

(57) ABSTRACT

The server includes a power supply apparatus; a power receipt terminal connected to a network and supplied with electric power fed to over the network; and a controller configured to perform state monitoring of the server by being supplied with electric power from the power supply apparatus, or electric power from the power supply apparatus and electric power from the power receipt terminal, and when supply of electric power from the power supply apparatus is quitted, the controller changes an electric power supply route so as to be supplied the electric power only from the power receipt terminal.

6 Claims, 6 Drawing Sheets

னSERVER

This application is based upon and claims the benefit of priority from Japanese Patent Application No. 2013-046388, filed on Mar. 8, 2013, the disclosure of which is incorporated herein in its entirety by reference.

TECHNICAL FIELD

The present invention relates to servers and, more particularly, to a sever provided with a controller for monitoring states inside the server.

BACKGROUND ART

Recently, it has become increasingly common for companies based in urban areas to establish a data center at a remote location far from the urban area, and keep various pieces of electronic data produced by its business activity in the data center. The pieces of electronic data are processed, stored, transmitted and received by various servers installed in the data center. In general, for example, as shown in FIG. 6, a rack mount server (hereinafter, referred to just a server) 101 includes a system board 102 on which a baseboard management controller (BMC) 103 is mounted, and the BMC 103 carries out state monitoring of devices and the like included in the server. A server power supply 106 supplies electric power to the BMC 103, and thus, during an interruption of the supply of electric power from the server power supply 106, the BMC 103 does not operate, so that it is difficult to grasp the state of the server. Further, in the case where there is a failure in the server 101 installed at a remote location, a server administrator needs to replace faulty components on site. In this case, when components to be replaced are unknown beforehand, it is necessary to deal with this problem by first identifying components to be replaced on sight and then replacing the relevant components, or replacing the server 101 itself.

Meanwhile, sometimes, there is a case where a spare power supply is reserved in order to make provision for a malfunction of a power supply for the server. However, such a spare power supply needs a depository, and thus increases cost.

In order to deal with these problems, recently, there has been proposed a system which supplies electric power to servers by using a power over Ethernet (PoE) (registered trademark) function.

For example, in Japanese Unexamined Patent Application Publication (JP-A) No. 2006-203730, there has been disclosed a technology for a power receipt terminal device which is provided with a plurality of power sources being each capable of receiving electric power and including a power source receiving electric power through a network cable, and which is capable of supplying a lower-layer power receipt terminal device connected to the power receipt terminal device itself with electric power from a power source which is among the plurality of power sources and which is not used for the power receipt terminal device itself.

Moreover, in Japanese Unexamined Patent Application Publication (JP-A) No. 2010-200279, there has been disclosed an electric power supply control technology for a server, which enables improvement of efficiency of electric power consumed by the server by supplying the server with appropriately selected one of direct-current power supplied from PoE and alternating-current power supplied externally.

SUMMARY

Technical Problem

In the technologies disclosed in JP-A No. 2006-203730 and JP-A No. 2006-203730, there is no disclosure with respect to handling of a situation in which the relevant server does not normally operate because of a malfunction of a power supply for the server.

An object of the present invention is to provide a server configured to, even in the situation where the server does not normally operate because of a malfunction of a power supply for the server, or the like, be capable of transmitting state monitoring records having been stored in the server, and being constantly state monitored.

Solution to Problem

In order to solve the aforementioned problem, a server according to an aspect of the invention includes a power supply apparatus; a power receipt terminal connected to a network and supplied with electric power fed to over the network; and a controller configured to perform state monitoring of the server by being supplied with electric power from the power supply apparatus, or electric power from the power supply apparatus and electric power from the power receipt terminal, and when supply of electric power from the power supply apparatus is quitted, the controller changes an electric power supply route so as to be supplied the electric power only from the power receipt terminal.

Advantageous Effect of Invention

The server according to the aspect of the invention is configured to, even in the situation where the server does not normally operate because of a malfunction of a power supply for the server, or the like, be capable of being supplied with electric power through a network switch complying with PoE specifications. Accordingly, it is possible to provide a server capable of being constantly state monitored.

EXEMPLARY EMBODIMENTS

Hereinafter, exemplary embodiments of the present invention will be described in detail with reference to the drawings.

<First Exemplary Embodiment>

Figure 1:
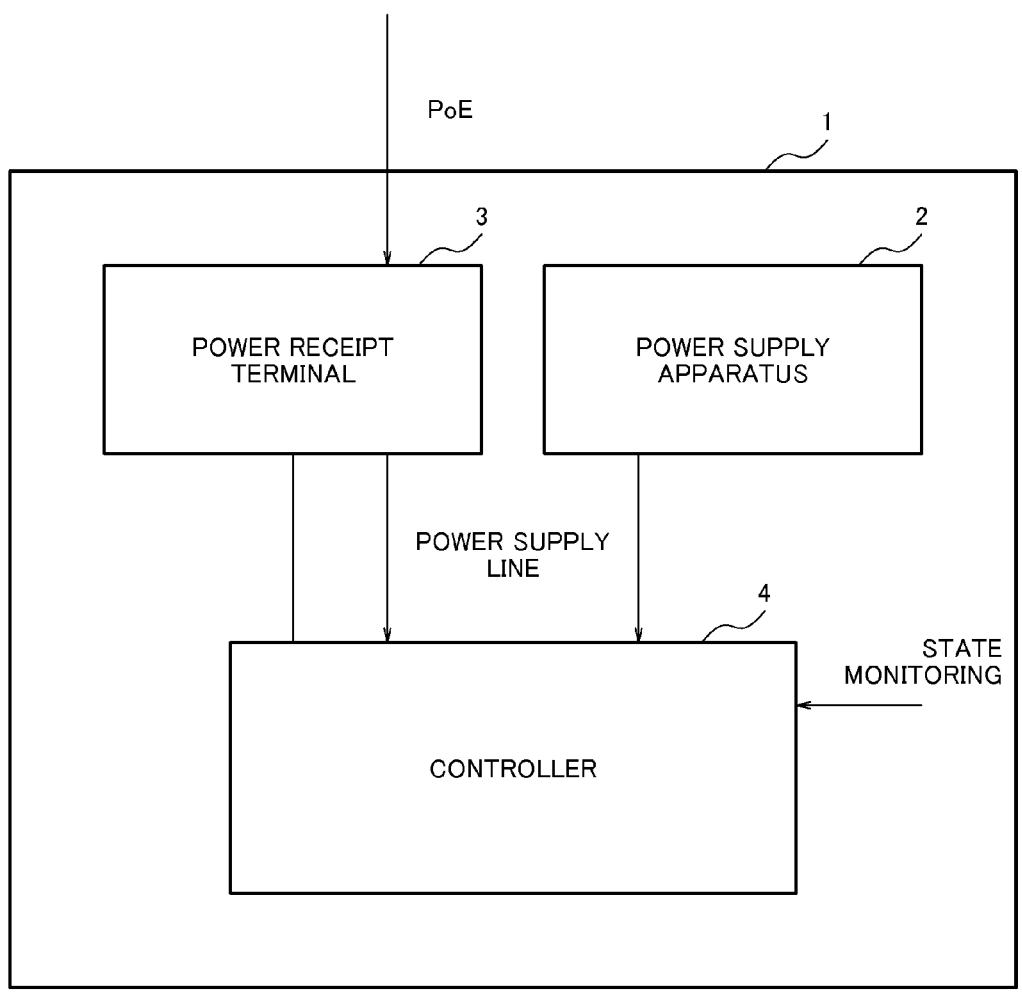
FIG. 1 is a block diagram illustrating an example of a configuration of a server according to a first exemplary embodiment of the present invention.

FIG. 1 is a block diagram illustrating an example of a configuration of a server according to a first exemplary embodiment of the present invention.

As shown in FIG. 1, a server 1 includes a power supply apparatus 2; a power receipt terminal 3 which is a network switch complying with PoE specifications; and a controller 4 capable of being supplied with both electric power from the power supply apparatus 2 and electric power from the power receipt terminal 3. The power supply apparatus 2 is capable of supplying electric power to individual portions (not illustrated) included in the server 1. The power receipt terminal 3 is connected to an administration network complying with PoE specifications. The controller 4 is capable of monitoring the states of individual portions (not illustrated) included in the server 1.

Figure 2:
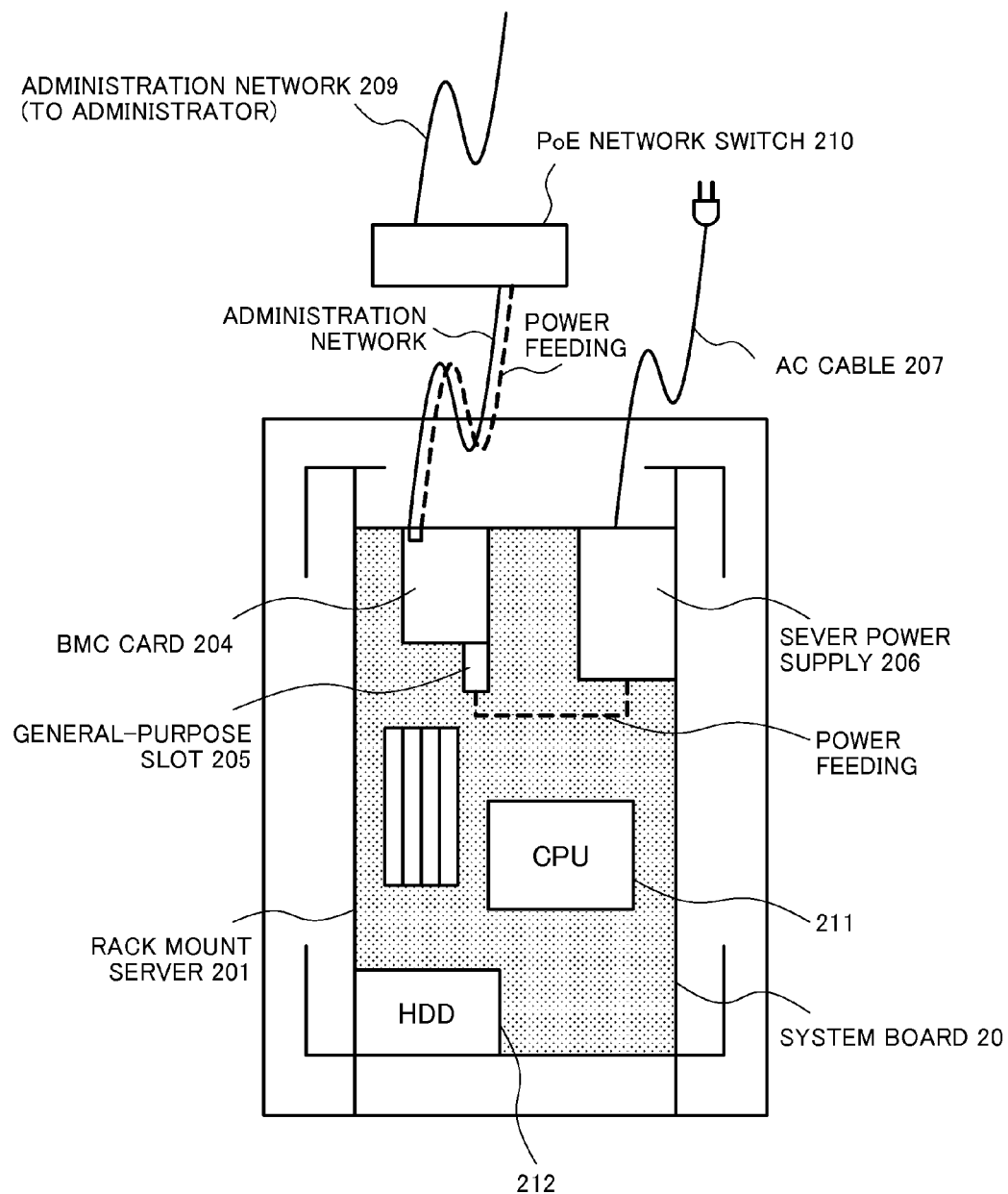
FIG. 2 is a block diagram illustrating an example of a specific configuration of a server according to a first exemplary embodiment of the present invention.

FIG. 2 is a block diagram illustrating an example of a specific configuration of a server according to this first exemplary embodiment of the present invention.

As shown in FIG. 2, a rack mount server 201 functioning as the server 1 is configured so as to place a system board 202 at the center of the rack mount server 201 itself. The system board 202 is connected to an administration network 209 through a PoE network switch 210 complying with PoE specifications and functioning as the power receipt terminal 3. The system board 202 includes a CPU 211 and a HDD 212, as well as a server power supply 206 (functioning as the power supply apparatus 2) which is externally supplied with alternating-current electric power through an AC cable 207. Further, the system board 202 includes a general-purpose slot 205 for use in mounting of a baseboard management controller (BMC) card 204 functioning as the controller 4. Signals and electric power from the administration network are supplied to the BMC card 204 through the PoE network switch 210.

In general, when the input of an alternating-current electric source to a server power supply is in the state of being turned on, the BMC operates by being supplied with a standby electric power whose voltage level is 5 V. Usually, the electric-current output of the standby electric power whose voltage level is 5 V is approximately from 1 A to 2 A. Thus, the power consumption of the BMC is approximately from several watts to ten and several watts. Meanwhile, a maximum electric power supply capability of PoE, defined with respect to a PoE switch, is 30 watts, and thus, the PoE switch is capable of supplying electric power sufficient for operation of the BMC.

According to this exemplary embodiment, it becomes possible to realize a server state monitoring function, such as a collection of malfunction information related to a server, independently of an environment of the main body of the server by independently mounting the BMC card 204, on which the BMC is mounted, into the general-purpose slot 205 of the system board 202 and supplying electric power to the BMC card 204 through the administration network 209.

Figure 3:
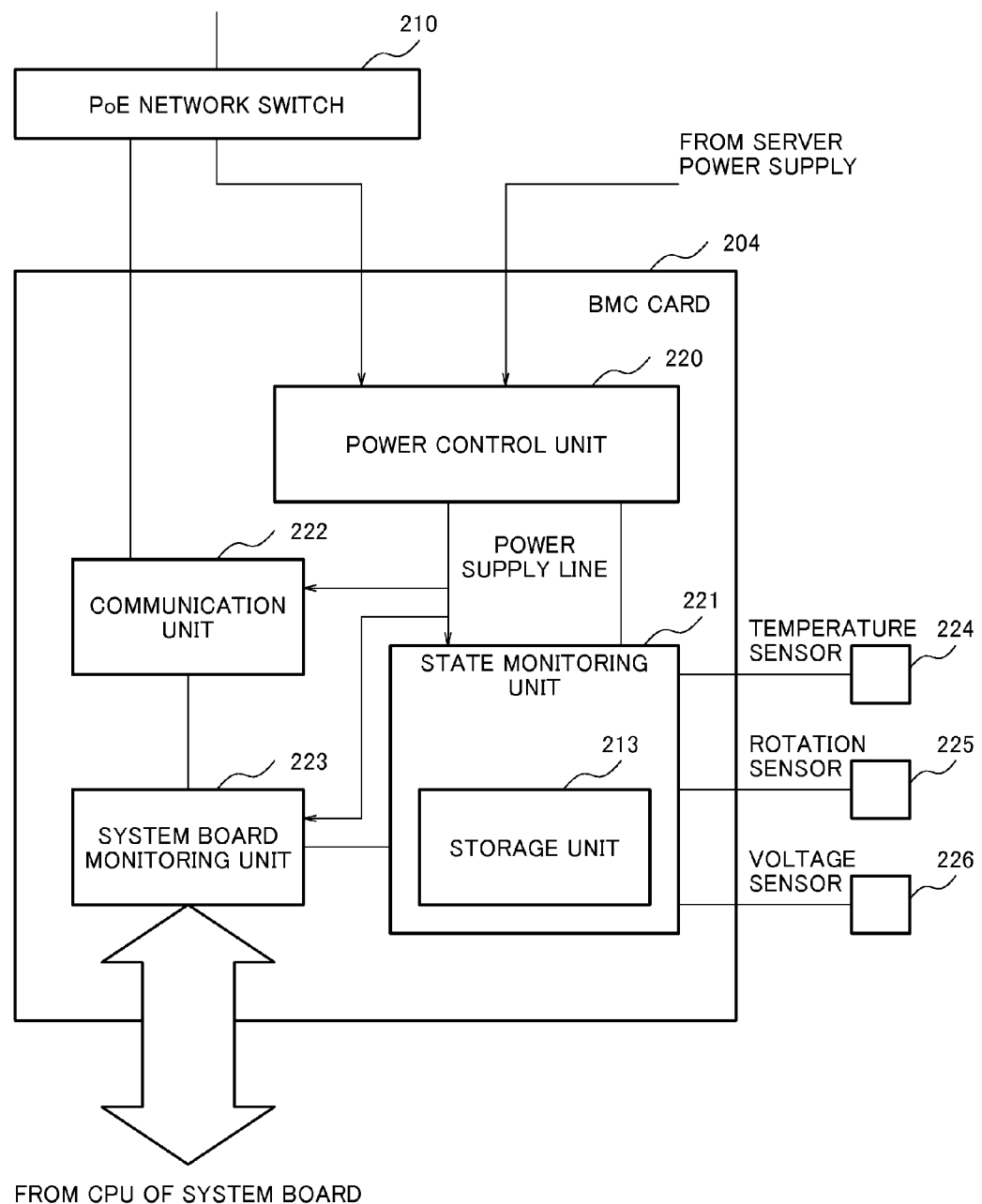
FIG. 3 is a block diagram illustrating an example of a specific configuration of a controller according to a first exemplary embodiment of the present invention.

FIG. 3 is a block diagram illustrating an example of a specific configuration of the BMC card 204. The BMC card 204 includes a power control unit 220, a state monitoring unit 221 provided with a storage unit 213, a communication unit 222 for communicating with a network, a system board control unit 223 for communicating with the system board 202 of the server. A temperature sensor 224 for monitoring temperatures inside the server, a rotation sensor 225 for monitoring the rotation numbers of fans, a voltage sensor 226 for monitoring voltage levels of voltages applied to the server, and the like, are connected to the state monitoring unit 221, and collected information is stored in the storage unit 213 at constant intervals of time. During normal operation, the various sensors operate to collect information by being supplied with electric power from the server power supply 206. The storage unit 213 is a non-volatile storage unit which retains storage information even after an interruption of the supply of electric power thereto. The collected information is transmitted to a different server (not illustrated) existing within the network at constant intervals of time. The constant interval of time can be set by the different server (not illustrated) in accordance with its need. The power control unit 220 is supplied with electric power from the server power supply 206 and electric power from the PoE network switch 210, and distributes electric power to the inside of the BMC card 204.

During normal operation, most of the electric power distributed to the inside of the BMC card 204 is covered by the electric power from the server power supply 206. Further, upon occurrence of a failure of the server power supply 206, the power control unit 220 switches an electric power supply route and thereby supplies the BMC card 204 with the electric power from the PoE network switch 210. Supposing that all of electric power supplied to the BMC card 204 is covered by the server power supply 206, a malfunction of the server power supply 206 causes an event in which operation of the BMC is brought to a complete stop. In order to prevent the occurrence of such an event, electric power which is supplied from the PoE network switch 210 and whose amount is sufficient for at least operation of the power control unit 220 is supplied to the power control unit 220 beforehand.

Even during a malfunction of the server power supply 206, the various sensors operate to collect information and store the collected information into the storage unit 213 by being supplied with electric power from the BMC card 204. The collected information is transmitted to the different server (not illustrated) existing within the network at constant intervals of time.

In addition, in the case where a configuration is made such that all of electric power supplied to the inside of the BMC card 204 is covered by the electric power from the PoE network switch 210 beforehand, the burden on the PoE side electric power becomes heavy when the number of state-monitored servers is large, and thus, an amount of the electric power supplied from the PoE network switch 210 is restricted to a necessary minimum.

Operation of a server according to an aspect of the invention will be described below with reference to FIG. 4.

Figure 4:
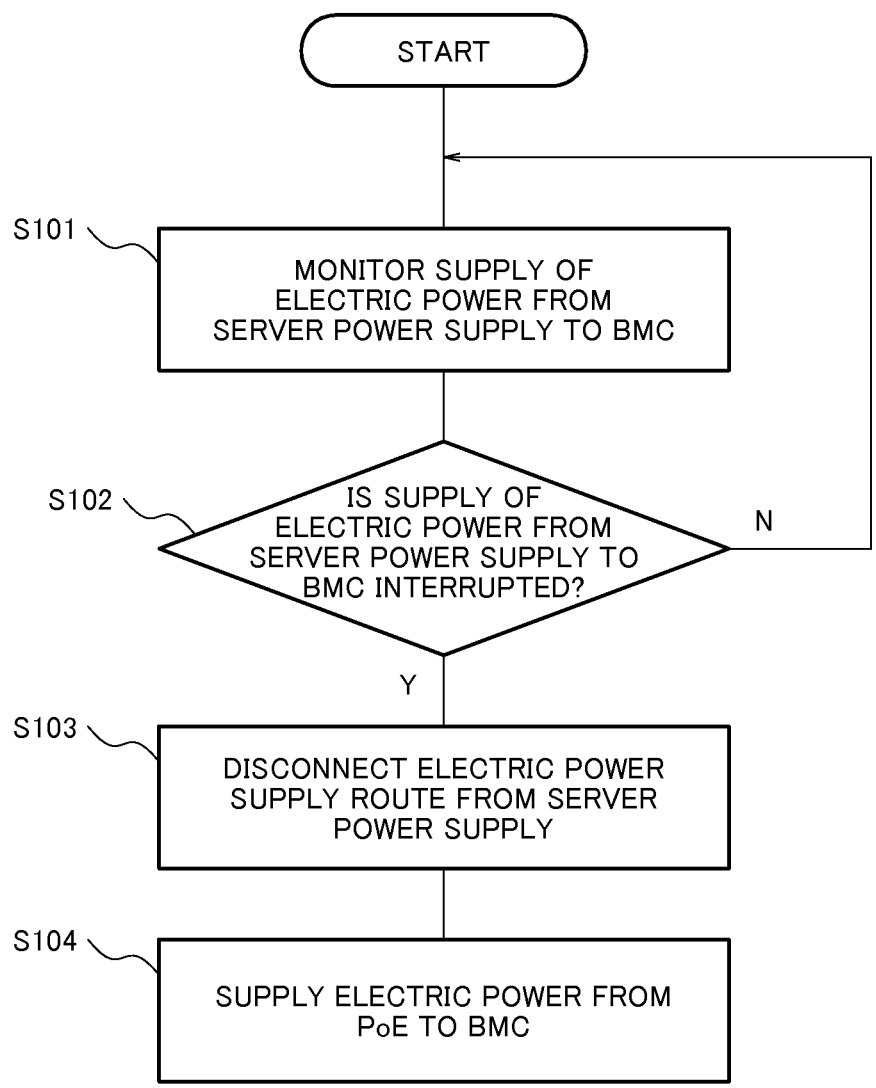
FIG. 4 is a flowchart illustrating operation of an exemplary embodiment of the present invention.

FIG. 4 is a flowchart illustrating a method for controlling the power control unit 220 in the first exemplary embodiment of the present invention.

In FIG. 4, the power control unit 220 monitors the supply of electric power from the server power supply 206 (S101). When the supply of electric power from the server power supply 206 has been interrupted because of a malfunction of the server power supply 206 (Yes in S102), the power control unit 220 disconnects the power supply route from the server power supply 206 (S103) and supplies the electric power from the PoE network switch 210 (S104).

As having been described above, it is possible to provide a server which is configured such that, even in the situation where the server does not normally operate because of a malfunction of a power supply for the server itself, or the like, the BMC card 204 is configured so as to be capable of being supplied with electric power through the PoE network switch 210, thereby enabling constant state monitoring of the inside of the server itself. Further, this configuration enables prompt recovery actions, such as a notification to an administrator and an identification of a malfunction point, thereby enabling restriction of server downtime to a minimum and enhancement of the continuity of service.

<Second Exemplary Embodiment>

Figure 5:
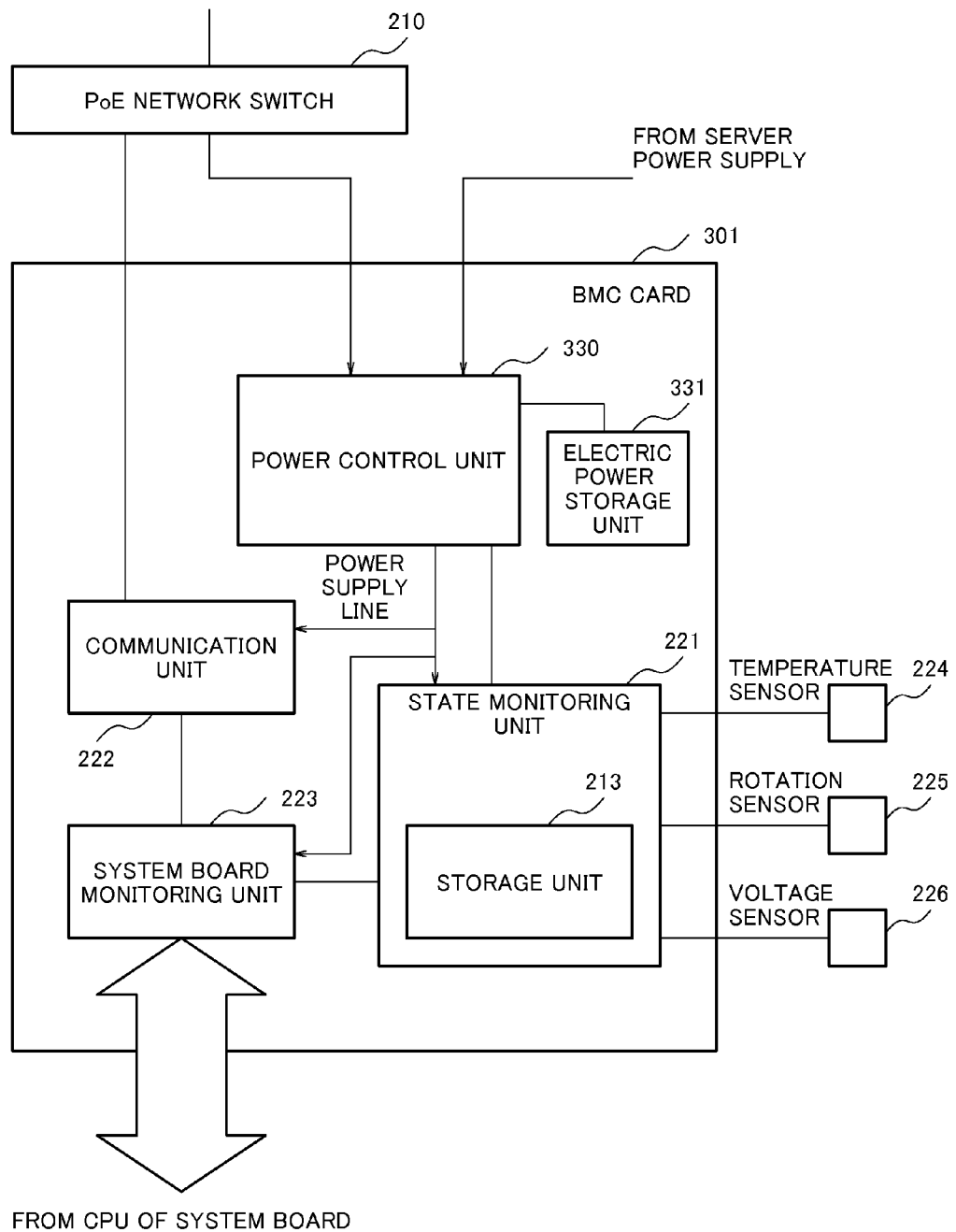
FIG. 5 is a block diagram illustrating an example of a specific configuration of a controller according to a second exemplary embodiment of the present invention.
Figure 6:
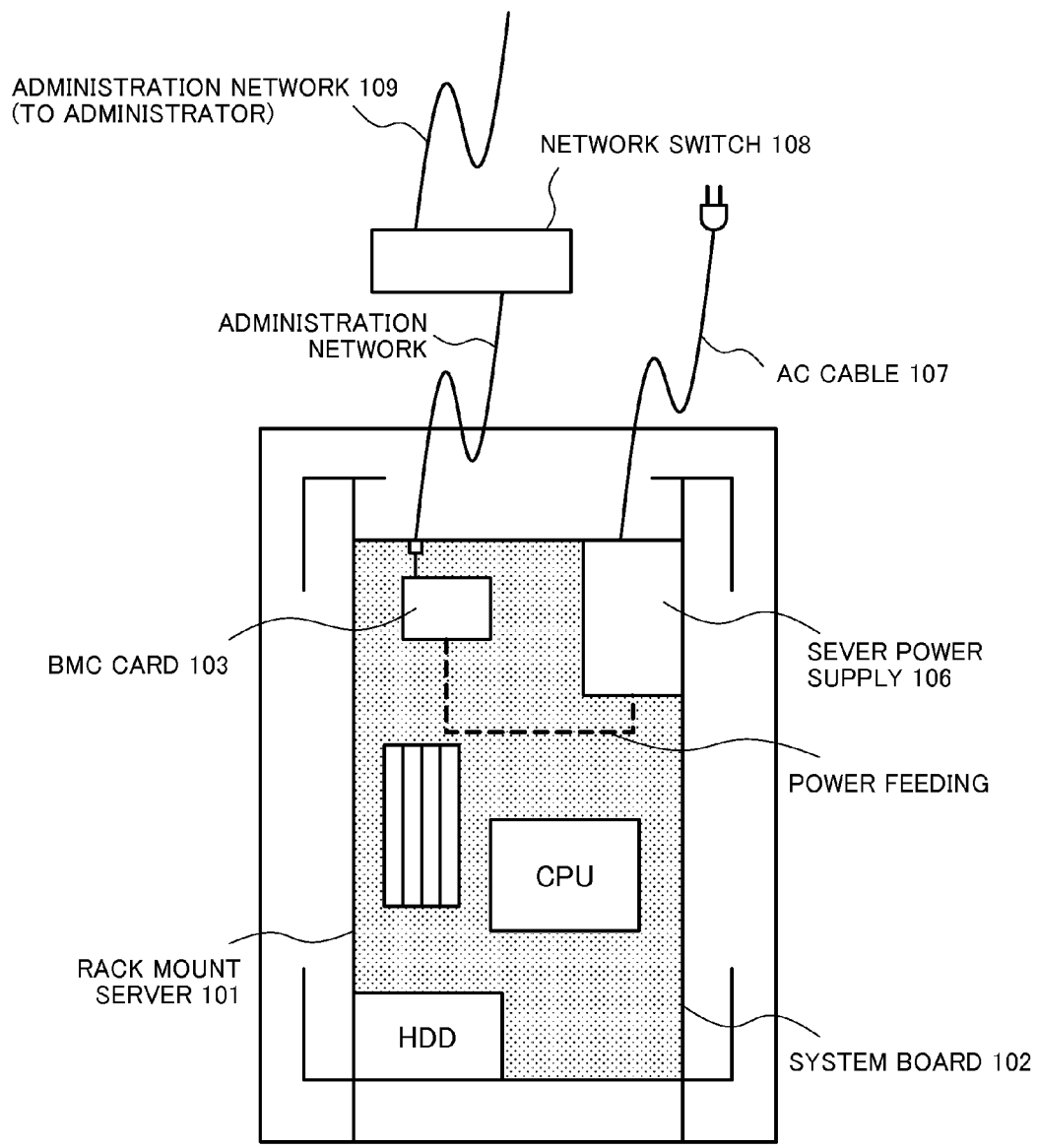
FIG. 6 is a block diagram illustrating a configuration of a related technology.

FIG. 5 is a block diagram illustrating an example of a specific configuration of a BMC card 301 according to a second exemplary embodiment of the present invention. The same components as components shown in FIG. 3, which illustrates an example of the configuration of the BMC card 204 according to the first exemplary embodiment, are denoted by the same reference numerals, and description thereof is omitted here.

The BMC card 301 includes a power control unit 330, an electric power storage unit 331 which temporarily stores therein electric power, a state monitoring unit 221 provided with a storage unit 213, a communication unit 222 for communicating with a network, and a system board control unit 223 for communicating with a system board 202 of the server.

The power control unit 330 is supplied with electric power from a server power supply 206 and electric power from a PoE network switch 210, and distributes electric power to the inside of the BMC card 301. Supposing that all of electric power supplied to the BMC card 301 is covered by the server power supply 206, a malfunction of the server power supply 206 causes an event in which operation of the BMC is brought to a complete stop. In order to prevent the occurrence of such an event, the electric power storage unit 331 stores therein electric power beforehand before the occurrence of a malfunction of the server power supply 206. Upon occurrence of a malfunction of the server power supply 206, the power control unit 330 is actuated by being supplied with electric power stored in the electric power storage unit 331 in order to supply electric power from the PoE network switch 210 to the BMC card 301. In addition, a capacitor, a storage battery or the like, which is capable of storing therein electric power, is employed as the electric power storage unit 331.

In addition, although operation of each of the various sensors is brought to a halt during a period when the power control unit 330 operates by being supplied with the electric power stored in the electric power storage unit 331, the various sensors resume operation of collecting state information at the time when the electric power from the PoE network switch 210 has been supplied to the BMC card 301 by the power control unit 330.

Since the amount of electric power to be stored in the electric power storage unit 330 is sufficient provided that the electric power stored in the power storage unit 331 merely enables the power control unit 330 to operate, the scale of the electric power storage unit 331 can be made small, and this leads to a cost saving.

As having been described above, it is possible to provide a server which is configured such that, even in the situation where the server does not normally operate because of a malfunction of a power supply for the server itself, or the like, the BMC card 301 is configured so as to be capable of being supplied with electric power through the PoE network switch 210, thereby enabling constant state monitoring of the inside of the server itself.

It is to be noted here that the present invention is not limited to the aforementioned exemplary embodiments, and various changes and modifications can be made within the scope not departing from the gist of the present invention. For example, the BMC may not be formed in the card shape, but may be directly provided on the system board.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

INDUSTRIAL APPLICABILITY

Further, the aforementioned technology can be applied to a server management system in which electric power is supplied to a system management controller included in a server targeted for management via the Ethernet (registered trademark).

What is claimed is:

1. A server comprising:
a power supply apparatus;
a power receipt terminal connected to a network and supplied with electric power fed to over the network; and
an electric power storage unit stored therein electric power; and
a controller configured to perform state monitoring of the server by being supplied with electric power from the power supply apparatus,
wherein, the controller, supplied with the electric power from the electric power storage unit, halts other components and switches an electric power supply route so as to be supplied the electric power from the power supply apparatus to the power receipt terminal for supplying the electric power to the other components when supply of electric power from the power supply apparatus is quitted.

2. The server according to claim 1, wherein the controller includes a power control unit configured to switch the electric power supply route.

3. The server according to claim 2, wherein, during operation of the power supply apparatus, the power control unit is supplied from the power receipt terminal with electric power whose amount is sufficient for operation of the power control unit itself.

4. The server according to claim 2, wherein, during an interruption of the supply of the electric power from the power supply apparatus, the power control unit supplies the controller with electric power which is supplied from the power receipt terminal and whose amount is sufficient only for operation of the controller.

5. The server according to claims 1, wherein the controller includes a storage unit configured to store therein a result of the state monitoring of the server, and during an interruption of the supply of the electric power from the power supply apparatus to the controller, the controller transmits information stored in the storage unit to a different server via the network on the basis of the electric power supplied from the power receipt terminal.

6. A server comprising:

a power supplying means;
- a power receipt terminal connected to a network and supplied with electric power fed to over the network;
- an electric power storage means stored therein electric power; and
- a controlling means for configuring to perform state monitoring of the server by being supplied with electric power from the power supplying means, or electric power from the power supplying means and electric power from the power receipt terminal, wherein, the controlling means, supplied with the electric power from the electric power storage means, halts other components and switches an electric power supply route so as to be supplied the electric power from the power supplying means to the power receipt terminal for supplying the electric power to the other components when supply of electric power from the power supply means is quitted.

* * * * *